April 3, 1951 P. G. KLEM 2,547,473
MACHINE FOR SIZING VEGETABLES
Original Filed July 22, 1942 3 Sheets-Sheet 1
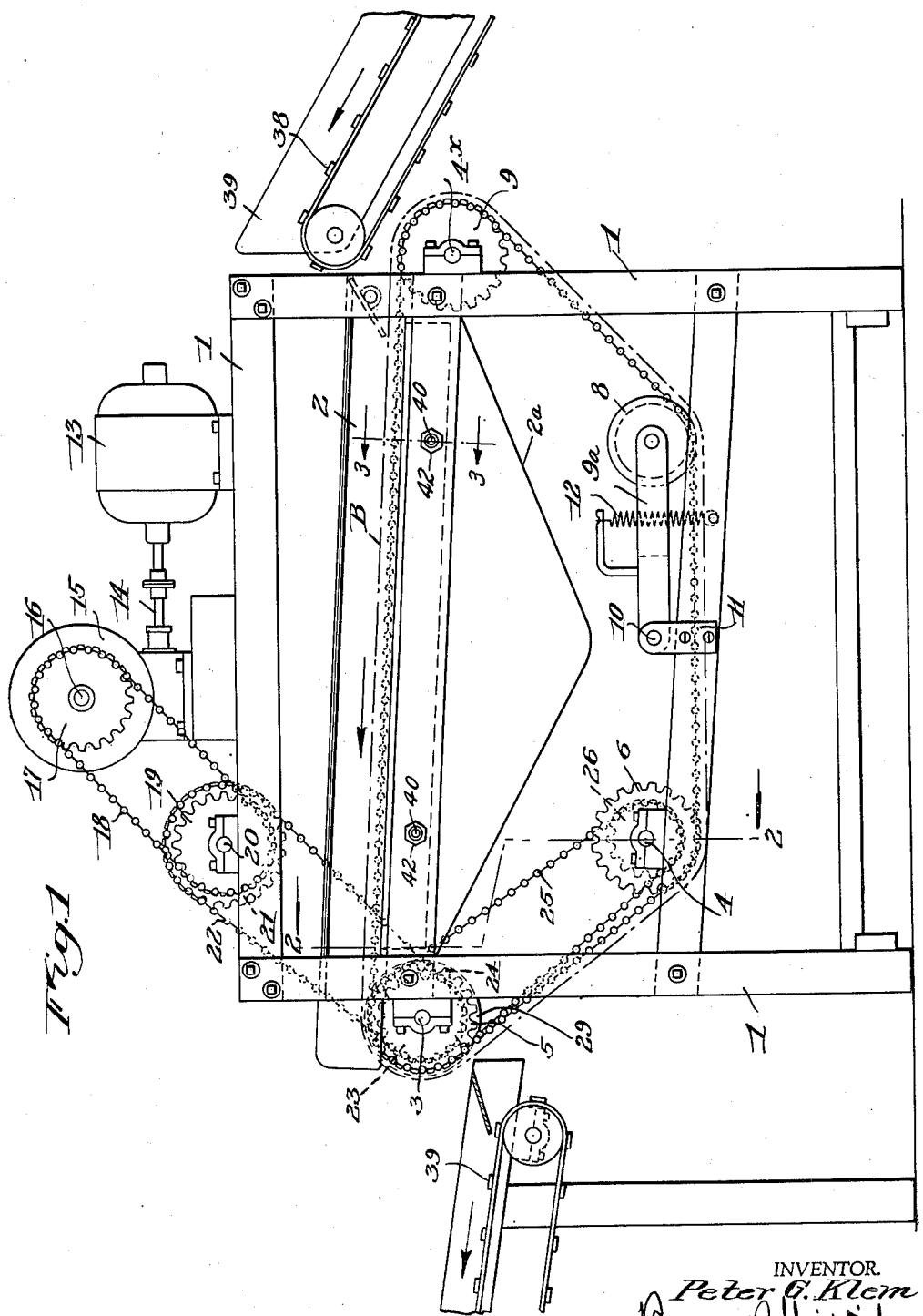
INVENTOR.
Peter G. Klem
BY
his Attorney April 3, 1951 P. G. KLEM 2,547,473
MACHINE FOR SIZING VEGETABLES
Original Filed July 22, 1942 3 Sheets-Sheet 2
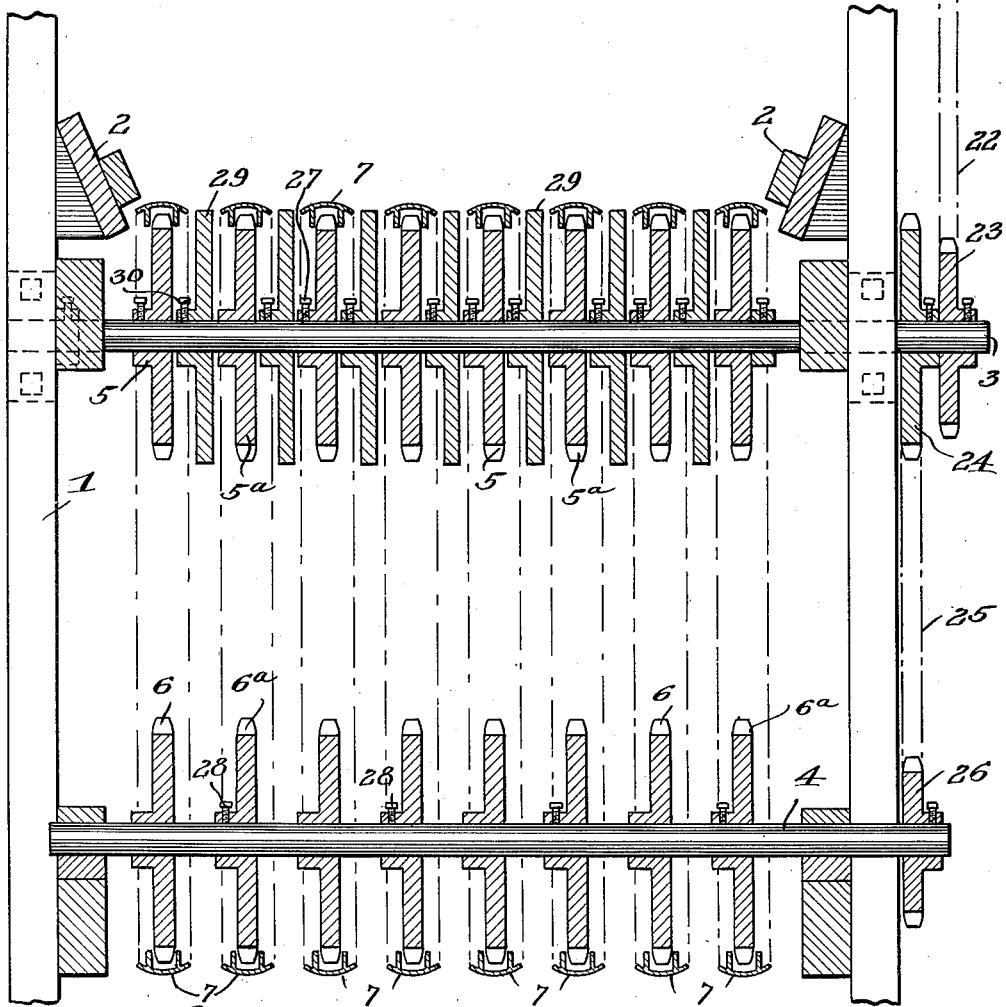
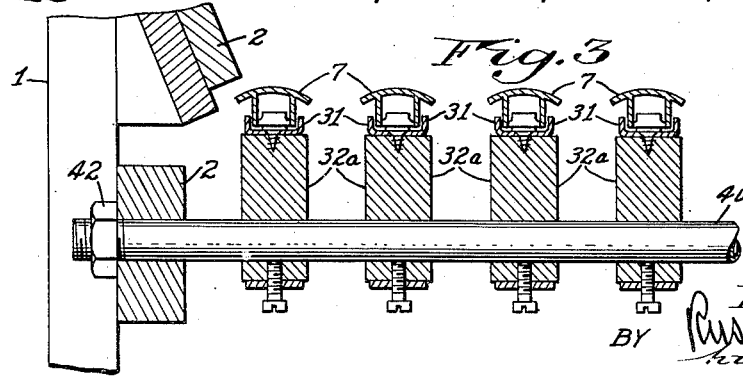
INVENTOR.
Peter G. Klem
BY
his Attorney April 3, 1951 P. G. KLEM 2,547,473
MACHINE FOR SIZING VEGETABLES
Original Filed July 22, 1942 3 Sheets-Sheet 3
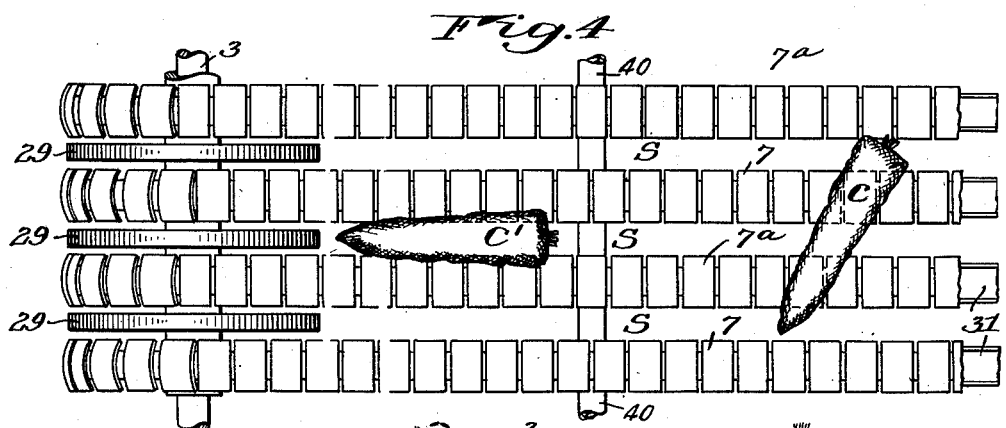
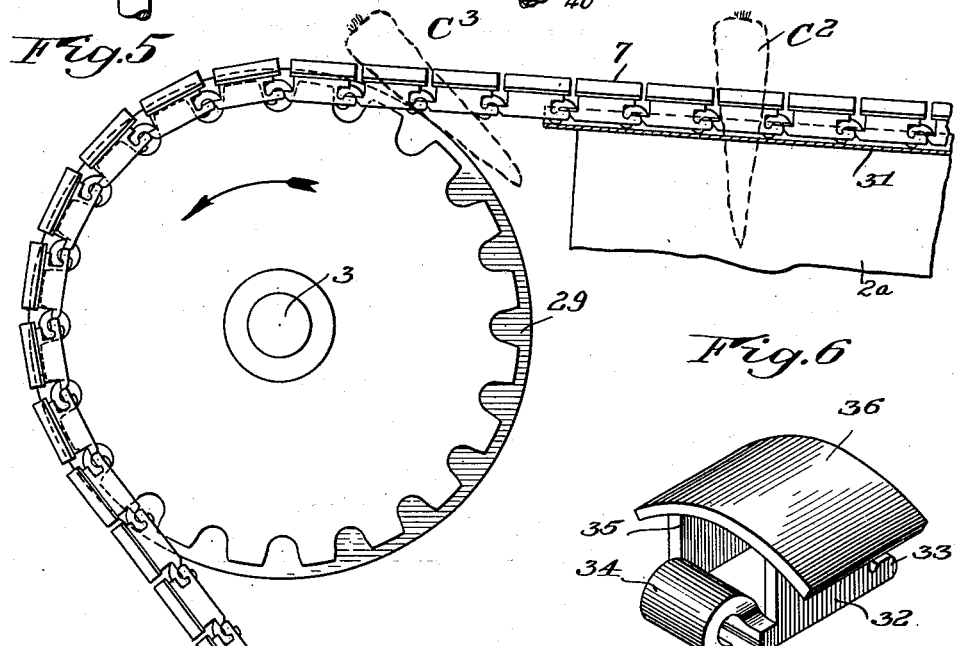
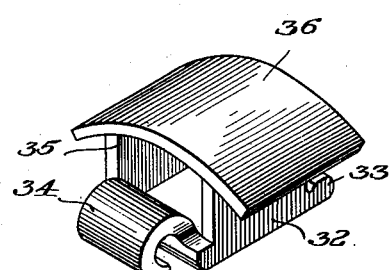
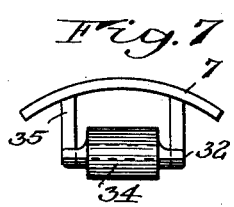
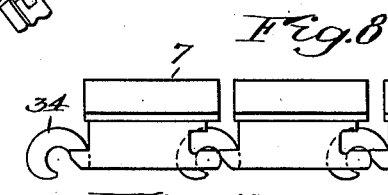
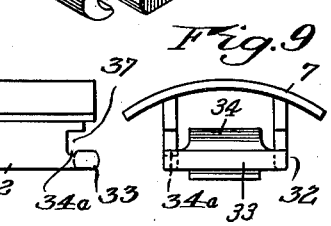
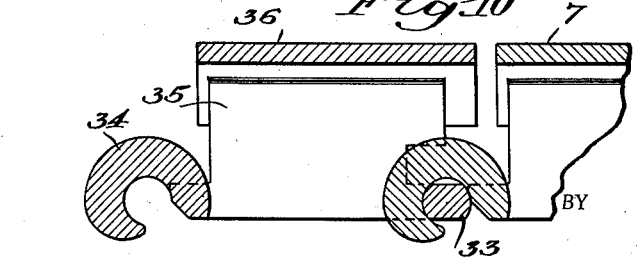
INVENTOR.
Peter G. Klem
BY
his Attorney Patented Apr. 3, 1951

2,547,473

UNITED STATES PATENT OFFICE 2,547,473

MACHINE FOR SIZING VEGETABLES

Peter G. Klem, Webster, N. Y.

Substituted for abandoned application Serial No. 451,881, July 22, 1942. This application January 2, 1946, Serial No. 638,646

5 Claims. (Cl. 209—102)

This application is a substitute of my earlier application Serial No. 451,881, filed July 22, 1942, which became abandoned.

My present invention relates to article sorting machines and more particularly to machines for sizing relatively small units, such as fruits and vegetables, and it has for its object to provide a simple and efficient apparatus of this character that will not be too expensive in manufacture and renewal of parts and which will be particularly adapted to the sizing of elongated articles, such as carrots, parsnips, and the like. The improvements are directed in part toward means for straightening out the articles in connection with a bed having slots so that they will be gauged as to diameter rather than length with provision for ejecting them gently for final delivery where they are of such intermediate size that they would otherwise become wedged in the sizing slots through which the smaller ones or culls are dropped. The improvements are further directed to the driving means and the particular construction of the conveyors that carry the articles through the separating process.

To these and other ends, the invention resides in certain improvements and combinations of parts, all as will be hereinafter more fully described, the novel features being pointed out in the claims at the end of this specification.

In the drawings:

Figure 1 is a side elevation of a sizing machine constructed in accordance with and illustrating one embodiment of my invention;

Figure 2 is an enlarged transverse section thereof taken substantially on the line 2—2 of Figure 1;

Figure 3 is a further enlarged detail transverse section taken on the line 3—3 of Figure 1;

Figure 4 is a fragmentary top plan view, enlarged, of a portion of the sizing bed;

Figure 5 is a still further fragmentary longitudinal section passing transversely through one conveyor shaft showing a sprocket and ejector unit in side elevation;

Figure 6 is a greatly enlarged perspective view of one of the conveyor chain links that jointly constitute the sizing bed;

Figure 7 is an end view of such link;

Figure 8 is a side view of a series of the links assembled constituting a fragment of one of the belts;

Figure 9 is a view of the link looking from the opposite end from Figure 7, and

Figure 10 is a greatly enlarged longitudinal section through adjacent links illustrative of the manner in which they are articulated.

Similar reference numerals throughout the several views indicate the same parts.

To first give an idea of the general conception and the major elements of my sizing machine, it comprises a body frame adapted for attachment to a hopper or feeding conveyor at its rear end and to a grading table unit or similar delivery device at its forward end. Near the top of the body frame is a bed that consists of the upper reaches of a plurality of chain belts running in parallel tracks or guides which belts are composed of successive articulated blocks rising from chain links. The widths of the intervening slots determine the minimum diameter of the articles that are to be carried on and the maximum diameter of the culls that fall through and are delivered laterally by a chute for appropriate disposal. The chains run over individual sprockets on driven shafts and the sprockets are adjustable longitudinally of the latter to vary the widths of the slots. These sprocket groups are alternately free and fixed on both shafts and the two shafts are driven at slightly different speeds, the arrangement being that alternate belts receive their carrying impulse from a single shaft although they travel around both. The result is that adjacent belts travel at different speeds and therefore any elongated article, such as a carrot, that falls transversely across both is quickly straightened out to be disposed longitudinally thereof when it reaches a slot between belts. If it is too small it falls through the slot. If it is of the desired size it is carried on longitudinally. In case a carrot of intermediate size wedges in the slot in an upright or similar position means are provided at the delivery end of the bed to dislodge it by gently raising it and tumbling it upon the receiving unit.

Referring more particularly to the drawings and first to Figure 1 thereof, 1 indicates the body frame and B the general plane of the conveyor bed thereon confined between side boards 2. The side boards support a shute or pan underlying the bed and inclined laterally toward one side of the bed so that dirt, culls, and loose tops that fall through the slots are deposited at one side.

At the front end of the bed, which travels from right to left in Figure 1 as indicated by the arrows, is a driven shaft 3 with a corresponding idle shaft 4x at the rear both mounted on suitable bearings. Below driven shaft 3 is another driven shaft 4. Shaft 3 is provided with a series of sprockets (Figure 2) 5, 5a while shaft 4 is provided with a series of corresponding sprockets 6, 6a. The sprockets 5 are secured to shaft 3 to rotate therewith, as will be described more particularly hereinafter. The sprockets 5a are free to rotate on shaft 3. Sprockets 6a are secured to shaft 4 to rotate therewith, while sprockets 6 are free to rotate on shaft 4. The belts constituting bed B and indicated generally at 7 traverse the sprockets 5, 5a, pass downwardly over the sprockets 6, 6a, thence rearwardly under jockey pulleys 8 and finally return upwardly over idler sprockets 9 free on shaft 4x at the rear of the bed. A belt, that runs over a sprocket 5 on shaft 3, travels over an idle or floating sprocket 6 on shaft 4; and a belt that runs over an idle sprocket 5a on shaft 3 travels over a sprocket 6a fixed to shaft 4. The jockeys 8 are carried on yokes 9 pivoted at 10 to bearing brackets 11 on the frame and are tensioned downwardly by springs 12 to maintain the chain belts taut.

The prime mover is in the present form of a motor 13 mounted on top of the frame 1. The motor shaft 14, through suitable worm and accompanying gearing in a gear case 15, rotates at an appropiate speed a drive shaft 16 carrying a sprocket 17. A chain 18 running from the latter drives a sprocket 19 on a jack shaft 20 mounted in suitable bearing on top of the frame. In turn, a companion sprocket 21 also fixed to jack shaft 20, through sprocket chain 22, drives sprocket 23 fixed to driven shaft 3. Another sprocket 24 on shaft 3 drives, through a chain 25, a relatively small sprocket 26 fixedly secured to drive shaft 4. The gear ratio thus provided causes shaft 4 to travel a little faster than shaft 3.

The sprockets 5 on shaft 3 are fixed thereto by set-screws 27. The intervening sprockets 5a are, as already stated, freely rotatable on shaft 3. The sprockets 6 on lower shaft 4 are, as previously stated, freely rotatable thereon, while the sprockets 6a are fixedly secured thereto by set-screws 28. Hence a fixed sprocket on one shaft cooperates with a free sprocket on the other to support and drive one of the belts with the result that alternate belts 7 are driven by one shaft and the other, intervening belts are driven by the other shaft. Since the two shafts 3 and 4 are driven at different speeds alternate belts 7 will travel at different speeds so that one belt will always be continuously passing the adjacent belt even though both are traveling in the same direction.

The effect of this is illustrated in Fig. 4. C indicates a carrot that has been fed onto and fallen crosswise of two of the belts. Since the belt 7a is traveling faster than the belt 7, the carrot is being twisted around as the end lying on the belt 7a is being dragged ahead by that belt. This result is that the carrot is being straightened out. It will finally reach the position indicated at C' where it extends longitudinally of the belts in alignment with the slots S formed by the spaces between the belts. If the carrot is larger than these slots S it will simply be carried on. If it is smaller than these slots at its greatest diameter it will fall through the slots. Thus the sizing operation is accomplished.

However, carrots of an intermediate size have a tendency to wedge upright in the slots S as indicated at C2 in Figure 5. To eject these without injury, I provide on shaft 3 at the delivery end of the bed and at the end of each slot S ejecting disks 29 one of which is secured to the shaft between each pair of sprockets 5 and 5a. They are secured to shaft 3 so that they have the same peripheral speed as the belts 7 and their rotating surfaces are substantially tangent to the plane of the supporting surfaces of the bed. When a wedged carrot therefore comes into contact with such a disk it is raised gently, as shown at C3 (Fig. 5), and impelled toward the delivery point. In the present embodiment these ejectors are separate units secured by their own set screws 30 but it is obvious that in some instances they could be provided in the form of offset rings on sprockets 5.

The bed formed by reaches of the belts 7 must be maintained without sag in a definite plane to produce uniformity in the sizing slots S and for this purpose I provide a longitudinally disposed guide or track 31 supporting each belt as best shown in Figure 3. These tracks preferably consist of channel irons as shown. They are mounted each on an individual longitudinally extending bar 32a, the bars being parallel and having a floating relationship to the frame 1, in general, as is about to be described. It is desirable to keep the dirt that accompanies freshly dug carrots in great quantities as much as possible from depositing in these tracks and in the particular construction of the belt units that I employ and hereinafter describe, this requirement is met.

Provision is made for changing the widths of the slots S to vary the standard of size. This is accomplished by changing the positions of the fixed sprockets 5 and 6a longitudinally of the shafts by means of their set screws with corresponding adjustments of the ejector disks 29. The guiding tracks 31 are also adjustable in the same direction toward and from each other. For this purpose, the beforementioned bars 32a are slidable upon transverse pipes or rods 40 (Figure 3 particularly) secured as by nuts 42 in the side boards 2. Thus the tracks and the sprockets may be aligned in a variety of positions in which lateral spacing is controlled. When all this is done it will be seen that the free sprockets 5a and 6 will adjust themselves, floating into aligned positions being confined by their rigid tracks and the rigid sprockets on each side. The same is true of the idle sprockets 9 on shaft 4x.

Referring more particularly to Figures 6 to 10, inclusive, the continuous belts 7 are made up of articulated chain links. The links are composed of rectangular frames 32, the connecting end pieces of which respectively constitute a pintle 33 and a knuckle 34, the knuckles having the form of downwardly opening hooks. The pintles are flattened on top and bottom as shown, and the side frame adjacent to them is notched at 34a to the reduced size of the knuckle opening so that the knuckles may be slid on laterally with the links to be coupled in an extreme angular position not reached in service and then rotated on the pintles to an interlocked position as will be understood by chain makers. This is a reversal of the usual coupling in which sprocket chain knuckles open upwardly or outwardly from the sprockets on which they run but the modification is made necessary by the particular construction of this link in an effort to produce a smooth and practically continuous carrot supporting surface on the belt reaches. Rising from the sides of the frame 32 are standards 35 on which is formed a smooth laterally arched top plate 36 over-hanging and projected well beyond the side of the frame. This overhang performs several functions. It protects the track in which the chain runs from a great deal of the dirt accompanying the carrots, as aforesaid, protects the carrots from contact with the guiding tracks and it provides a definite line at the boundary of each sizing slot. The arch of the top plate is perfectly smooth and it is difficult for a carrot to lodge upon its high point without slipping one way or the other into an adjacent slot. The standards 35 are also notched at 37 (Fig. 8) in continuation of the notches 34a in the link frames for the same purpose.

A sizing machine constructed in accordance with my invention may be made large enough to size effectively an average crop of carrots in a few hours, yet small enough to be portable to the extent that it may be loaded upon a farm wagon or a truck and transported to the field instead of carting the carrots to the machine. In line with this purpose, I preferably make my feeding and delivery units separate from the body or sizing unit. The first mentioned may be the usual slatted elevating conveyor 38 (Fig. 1) mounted in a frame 39 that merely hooks onto frame 1. Such attaching means may consist of devices engaging shaft 4x that have been omitted from Figure 1 to avoid confusion. The one requirement is that the carrots be dumped rapidly on the rear end of the bed in the region of shaft 4x. At the other end the carrots are delivered at the downward turn of the sprockets 6 and 6a upon another smaller conveyor 39 that transports them to the usual hand grading, sorting or packing table.

I have confined the above description to use of the invention in connection with the treatment of carrots for convenience of explanation but, as stated introductorily, the field of usefulness is not so limited.

I claim as my invention:

1. In a sizing machine for separating vegetables and the like, the combination with a conveyor bed comprising a plurality of parallel traveling belts, adjacent belts being spaced the desired distance apart to permit undersize units to fall through the spaces between them, and means for driving adjacent belts at different speeds, of a plurality of rotary disks, one of which is arranged in the space between each pair of adjacent belts at the delivery end of the bed to project into said space, and means for rotating said disks, said disks being all of the same diameter but lying beneath the outer surface of the conveyor bed at said delivery end.

2. In a sizing machine for separating vegetables and the like, the combination with a conveyor bed embodying a plurality of parallel, articulated traveling belts, adjacent belts being spaced the desired distance apart to permit undersize units to fall through the slots thus provided between them, of means for driving said belts comprising two spaced shafts, a plurality of sprockets on each shaft over which the belts travel, alternate sprockets of each shaft being locked to the shaft and being idle, freely rotatable thereon, respectively, and each belt being arranged so that it travels over a locked sprocket on one shaft and an idle, rotatable sprocket on the other shaft, and means for driving the two shafts at different speeds.

3. In a sizing machine for separating vegetables and the like, a conveyor bed comprising a plurality of endless traveling belts, adjacent belts being spaced apart to permit undersize units to fall through the spaces between them, of a pair of shafts, a plurality of wheels carried by each shaft over which the belts travel, said wheels being adjustable axially on their respective shafts, to determine the space between adjacent belts, means for locking alternate wheels of each shaft to the shaft, the remaining wheels of each shaft being idlers, freely rotatable thereon, each belt being arranged to travel over a locked wheel on one shaft and an idler on the other shaft, and means for driving the two shafts at different speeds.

4. In a sizing machine for separating vegetables and the like, the combination with a conveyor bed embodying a plurality of articulated traveling belts, adjacent belts being spaced the desired distance apart to permit undersize units to fall through the slots thus provided between them, of a shaft at the rear feed end of the bed provided with a plurality of free floating sprockets over which the belts run, a driven shaft at the front delivery end of the bed provided with a corresponding plurality of sprockets over which the belts also run, the sprockets on said driven shaft being alternately freely rotatable thereon and fixed thereto, and a second driven shaft below the first driven shaft provided with a plurality of sprockets over which the belts also run, the sprockets on said second driven shaft being also alternately freely rotatable thereon and fixed thereto, a fixed sprocket on one driven shaft being arranged to cooperate with a free sprocket on the other driven shaft to support a given belt, the fixed sprockets on both shafts being adjustable longitudinally thereof, and means for driving the two driven shafts at different speeds.

5. In a sizing machine for separating vegetables and the like, the combination with a conveyor bed embodying a plurality of articulated traveling belts, adjacent belts being spaced the desired distance apart to permit undersize units to fall through the slots thus provided between them, of a shaft at the rear feed end of the bed provided with a plurality of free floating sprockets over which the belts run, a driven shaft at the front delivery end of the bed provided with a corresponding plurality of sprockets over which the belts also run, the sprockets on said driven shaft being alternately freely rotatable thereon and fixed thereto, a second driven shaft below the first driven shaft provided with a plurality of sprockets over which the belts also run, the sprockets on said second driven shaft being also alternately freely rotatable thereon and fixed thereto, a fixed sprocket on one driven shaft being arranged to cooperate with a free sprocket on the other driven shaft to support a given belt, the fixed sprockets on both shafts being adjustable longitudinally thereof, means for driving the two driven shafts at different speeds, and a plurality of rotating disks arranged on the first mentioned driven shaft between the belts at the delivery end of the bed with their peripheries substantially tangent to the supporting surface of the belts for dislodging and ejecting oversize units that become wedged in said slots.

PETER G. KLEM.

REFERENCES CITED

The following references are of record in the file of this patent:

UNITED STATES PATENTS

| Number | Name | Date |
|---|---|---|
| 268,883 | Gowan | Dec. 12, 1882 |
| 1,178,006 | Gehr | Apr. 4, 1916 |
| 1,204,685 | Phillips | Nov. 14, 1916 |
| 1,338,276 | Barghausen | Apr. 27, 1920 |
| 1,534,663 | Sammis et al. | Apr. 21, 1925 |
| 1,694,724 | Rogers | Dec. 11, 1928 |
| 1,841,333 | Kyle et al. | Jan. 12, 1932 |
| 1,868,356 | Helenbolt | July 19, 1932 |
| 2,024,846 | Burgess et al. | Dec. 17, 1935 |
| 2,143,593 | Bryant | Jan. 10, 1939 |
| 2,314,479 | Christiansen | Mar. 23, 1943 |
| 2,350,691 | Mauroner | June 6, 1944 |

FOREIGN PATENTS

| Number | Country | Date |
|---|---|---|
| 375 | Holland | Dec. 1, 1916 |
| 418,685 | Great Britain | Oct. 30, 1934 |